United States Patent
Cho et al.

(10) Patent No.: US 11,508,075 B2
(45) Date of Patent: Nov. 22, 2022

(54) METHOD AND APPARATUS FOR TRACKING TARGET

(71) Applicant: Samsung Electronics Co., Ltd., Suwon-si (KR)

(72) Inventors: Sung Kwang Cho, Seoul (KR); Changbeom Park, Seoul (KR); Byung In Yoo, Seoul (KR); Hyunjeong Lee, Seoul (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 17/027,756

(22) Filed: Sep. 22, 2020

(65) Prior Publication Data

US 2021/0295534 A1    Sep. 23, 2021

(30) Foreign Application Priority Data

Mar. 18, 2020 (KR) .................. 10-2020-0033185

(51) Int. Cl.
*G06T 7/246* (2017.01)
*G06T 7/73* (2017.01)
*G06T 7/11* (2017.01)
*G06K 9/62* (2022.01)
(Continued)

(52) U.S. Cl.
CPC ............ *G06T 7/248* (2017.01); *G06K 9/6215* (2013.01); *G06K 9/6232* (2013.01); *G06N 3/0454* (2013.01); *G06T 7/11* (2017.01); *G06T 7/174* (2017.01); *G06T 7/74* (2017.01);
(Continued)

(58) Field of Classification Search
CPC .. G06N 3/0454; G06K 9/6232; G06K 9/6215; G06T 7/11; G06T 7/74; G06T 7/248
See application file for complete search history.

(56) References Cited

U.S. PATENT DOCUMENTS 9,584,716 B2 * 2/2017 Gurbuz .............. H04N 5/23258
2006/0045329 A1 * 3/2006 Jones ..................... G06V 10/24
382/154

(Continued)

FOREIGN PATENT DOCUMENTS

JP    2017-156796 A    9/2017
JP    2018-77829 A    5/2018
(Continued)

OTHER PUBLICATIONS

Cao et al. "Fast Deep Neural Networks With Knowledge Guided Training and Predicted Regions of Interests for Real-Time Video Object Detection" IEEE Access (Special Section on Sequential Data Modeling and Its Emerging Applications) vol. 6 2169-3536 [pp. 1-10) Mar. 13, 2018.*

(Continued)

*Primary Examiner* — Mia M Thomas
(74) *Attorney, Agent, or Firm* — NSIP Law

(57) ABSTRACT

Disclosed are target tracking methods and apparatuses. The target tracking apparatus performs target tracking on an input image obtained in a first time period within a single time frame, using a light neural network in a second time period of the single time frame. The target tracking apparatus may perform target tracking on input images generated within the same time frame.

15 Claims, 10 Drawing Sheets

(51) Int. Cl.
*G06N 3/04* (2006.01)
*G06T 7/174* (2017.01)
(52) U.S. Cl.
CPC .............. *G06T 2207/20084* (2013.01); *G06T 2207/20132* (2013.01)

(56) References Cited

U.S. PATENT DOCUMENTS

| | | | |
|---|---|---|---|
| 2008/0267494 A1* | 10/2008 | Cohen | G06T 3/4007 382/166 |
| 2016/0144505 A1* | 5/2016 | Fong | B25J 9/1697 700/250 |
| 2016/0343366 A1* | 11/2016 | Fructuoso | G10L 13/08 |
| 2017/0200090 A1* | 7/2017 | Hershey | G06N 7/005 |
| 2018/0253848 A1 | 9/2018 | Chen et al. | |
| 2018/0336424 A1* | 11/2018 | Jang | B60W 30/0956 |
| 2019/0180115 A1* | 6/2019 | Zou | B60W 30/12 |
| 2019/0266420 A1* | 8/2019 | Ge | G06T 7/248 |
| 2019/0310651 A1* | 10/2019 | Vallespi-Gonzalez | B60W 60/0015 |
| 2020/0163639 A1* | 5/2020 | De Man | G06T 7/20 |
| 2020/0293019 A1* | 9/2020 | Putman | G06N 3/006 |
| 2022/0059094 A1* | 2/2022 | Thomson | G10L 15/26 |

FOREIGN PATENT DOCUMENTS

| | | |
|---|---|---|
| JP | 2018-129738 A | 8/2018 |
| KR | 10-2017-0062959 A | 6/2017 |
| KR | 10-2018-0108123 A | 10/2018 |

OTHER PUBLICATIONS

Rehman et al. "Using Margin-Based Region of Interest Technique with Multi-task Convolutional Neural Network and Template Matching for Robust Face Detection and Tracking System" 2nd International Conf on Imaging, Signal Processing and Communication, Apr. 2018, pp. 1-5.*

Park, Eunhyeok et al., "Big/Little Deep Neural Network for Ultra Low Power Inference", *2015 International Conference on Hardware/Software Codesign and System Synthesis (CODES+ISSS)*, 2015 (pp. 124-132).

Bertinetto, Luca et al., "Fully-Convolutional Siamese Networks for Object Tracking", *European conference on computer vision. Springer, Cham*, Sep. 14, 2016 (pp. 1-16).

He, Zhenyu et al., "Robust Object Tracking via Key Patch Sparse Representation", *IEEE Transactions on Cybernetics*, vol. 47, Issue 2, Feb. 2017 (pp. 354-364).

Tann, Hokchhay et al., "Flexible Deep Neural Network Processing", arXiv preprint arXiv:1801.07353, Jan. 23, 2018 (pp. 1-6).

Cosma, Adrian et al., "CamLoc: Pedestrian Location Detection from Pose Estimation on Resource-constrained Smart-cameras", arXiv preprint arXiv:1812.11209, Dec. 28, 2018 (pp. 1-10).

Kumar, Athindran Ramesh, et al., "Pack and Detect: Fast Object Detection in Videos Using Region-of-Interest Packing", *Proceedings of the ACM India Joint International Conference on Data Science and Management of Data*, Jan. 26, 2019 (pp. 1-14).

Chen, Chun-Fu, et al. "Big-Little Net: An Efficient Multi-Scale Feature Representation for Visual and Speech Recognition", arXiv preprint arXiv:1807.03848, Jul. 31, 2019 (pp. 1-20).

* cited by examiner

METHOD AND APPARATUS FOR TRACKING TARGET

CROSS-REFERENCE TO RELATED APPLICATIONS

This application claims the benefit under 35 USC § 119(a) of Korean Patent Application No. 10-2020-0033185 filed on Mar. 18, 2020 in the Korean Intellectual Property Office, the entire disclosure of which is incorporated herein by reference for all purposes.

BACKGROUND

1. Field

The following description relates to a technique for tracking a target in real time within a single time frame.

2. Description of Related Art

Target tracking is used to estimate the position of a moving object in a video, and is different from object detection. Object detection is a process of identifying a shape, determined to be similar to a set of pixels indicating an object in a frame sequence, as the object. For example, object detection may be performed by various techniques such as frame differencing, optical flow, and background subtraction.

Object classification is a process of classifying objects into various types of objects. For example, object classification may be performed by various techniques such as shape-based classification, motion-based classification, color-based classification, and texture-based classification.

Object tracking may be a process of tracking an object in a frame sequence. Object tracking includes a process of approximately estimating a position of a predetermined object in a subsequent frame based on its position in a previous frame, and tracking the position of the object through similarity determination. For example, object tracking may be performed by techniques such as point tracking, kernel tracking, and silhouette tracking. Hereinafter, a frame refers to each of images constituting a video, and a time frame refers to a time period in which each of successive images is generated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of tracking a target includes setting a region of interest (ROI) in an input image of a previous time frame based on position information of a target derived in a previous-previous time frame prior to the previous time frame, during a first time period of a current time frame, using a first neural network, estimating position information of the target of the previous time frame in the ROI of the previous time frame based on a template image including the target, during the first time period, using the first neural network, setting a ROI in an input image of the current time frame based on the position information of the target of the previous time frame, during a second time period of the current time frame, using a second neural network, and estimating position information of the target of the current time frame in the ROI of the current time frame based on the template image, during the second time period, using the second neural network.

The input image of the current time frame may be acquired by digitizing optical information stored in an image sensor, during the first time period.

The accuracy of the first neural network may be higher than the accuracy of the second neural network.

The method may further include outputting a bounding box indicating the position information of the target of the current time frame estimated using the second neural network.

The estimating of the position information of the target of the previous time frame may include extracting a feature matrix of the template image and a feature matrix of the ROI of the previous time frame, using the first neural network, calculating a similarity between the feature matrix of the template image and the feature matrix of the ROI of the previous time frame, using the first neural network, and estimating the position information of the target of the previous time frame from a region having a highest similarity in the ROI of the previous time frame, using the first neural network.

The estimating of the position information of the target of the current time frame may include extracting a feature matrix of the template image and a feature matrix of the ROI of the current time frame, using the second neural network, calculating a similarity between the feature matrix of the template image and the feature matrix of the ROI of the current time frame, using the second neural network, and estimating the position information of the target of the current time frame from a region having a highest similarity in the ROI of the previous time frame, using the second neural network.

The estimating of the position information of the target of the previous time frame may further include cropping the ROI of the previous time frame from the input image of the previous time frame, resizing the cropped ROI of the previous time frame to a predetermined size, and inputting the resized ROI of the previous time frame into the first neural network.

The estimating of the position information of the target of the current time frame may further include cropping the ROI of the current time frame from the input image of the current time frame, resizing the cropped ROI of the current time frame to a predetermined size, and inputting the resized ROI of the current time frame into the second neural network.

In another general aspect, there is provided a method of tracking a target including setting a ROI in an input image of a previous time frame based on position information of a target derived in a previous-previous time frame, during a first time period of a current time frame, using a second neural network, estimating position information of the target of the previous time frame indicating a position and a size of the target of the previous time frame in the ROI of the previous time frame based on a template image including the target, during the first time period, using the second neural network, setting a ROI in an input image of the current time frame based on the position information of the target of the previous time frame, during a second time period of the current time frame, using the second neural network, and estimating position information of the target of the current time frame in the ROI of the current time frame based on the template image, during the second time period, using the second neural network.

The input image of the current time frame may be acquired by digitizing optical information stored in an image sensor, during the first time period.

In another general aspect, there is provided an apparatus for tracking a target including a memory, and a processor may be configured to set a ROI in an input image of a previous time frame based on position information of a target estimated in a previous-previous time frame, during a first time period of a current time frame, using a first neural network, estimate position information of the target of the previous time frame in the ROI of the previous time frame based on a template image including the target, during the first time period, using the first neural network, set a ROI in an input image of the current time frame based on the position information of the target of the previous time frame, during a second time period of the current time frame, using a second neural network, and estimate position information of the target of the current time frame in the ROI of the current time frame based on the template image, during the second time period, using the second neural network.

The input image of the current time frame may be acquired by digitizing optical information stored in an image sensor, during the first time period.

In another general aspect, there is provided an apparatus for tracking a target, which includes a memory and a processor that is configured to set a ROI in an input image of a previous time frame based on position information of a target estimated in a previous-previous time frame, during a first time period of a current time frame, using a second neural network, estimate position information of the target of the previous time frame in the ROI of the previous time frame based on a template image including the target, during the first time period, using the second neural network, set a ROI in an input image of the current time frame based on the position information of the target of the previous time frame, during a second time period of the current time frame, using the second neural network, and estimate position information of the target of the current time frame in the ROI of the current time frame based on the template image, during the second time period, using the second neural network.

The input image of the current time frame may be acquired by digitizing optical information stored in an image sensor, during the first time period.

Other features and aspects will be apparent from the following detailed description, the drawings, and the claims.

Figure 1:
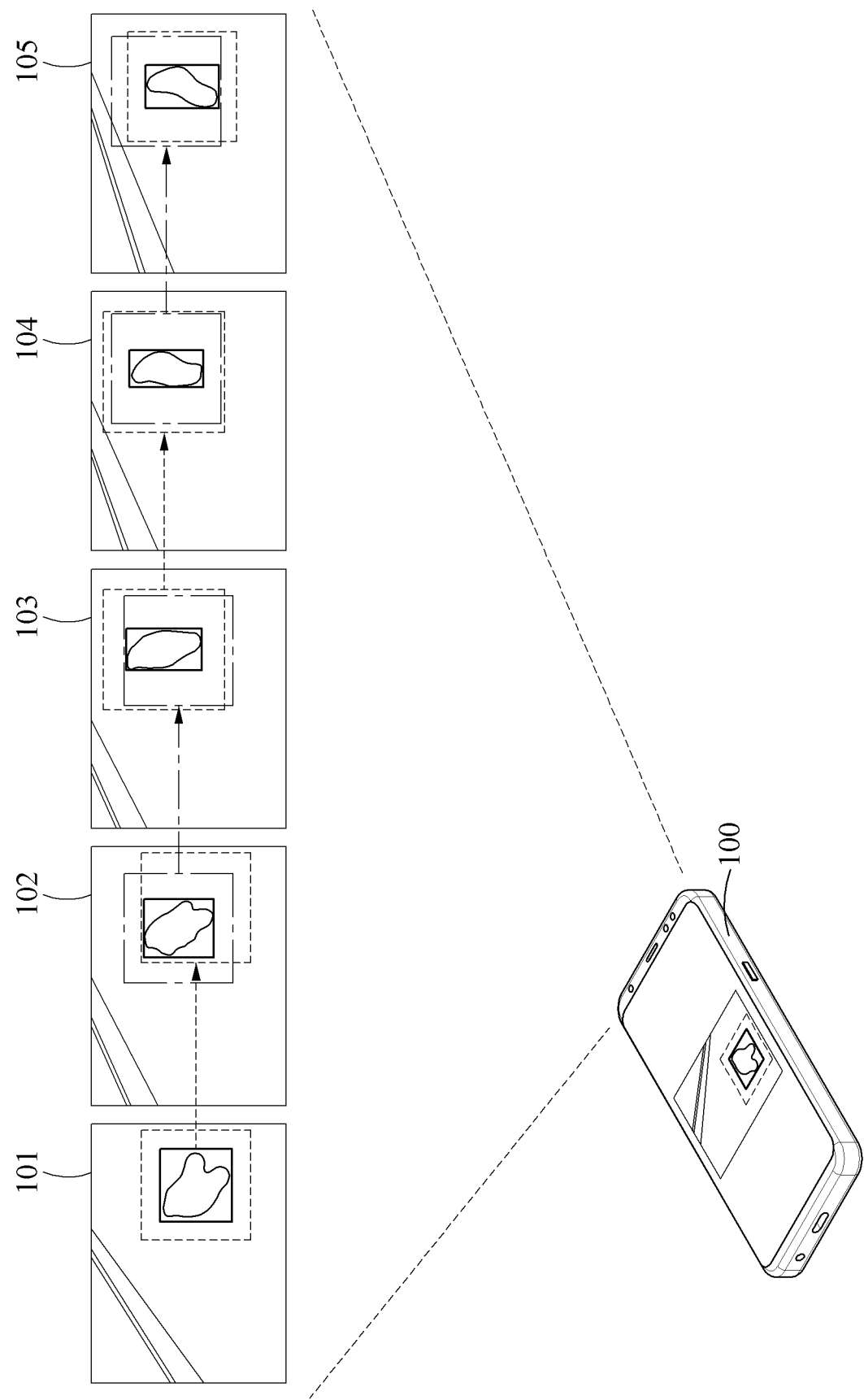
FIG. 1 illustrates an example of tracking a target in an input image by a target tracking apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Meanwhile, in some alternative implementations, functions or operations specified in predetermined blocks may be performed in an order different from that shown in a flowchart. For example, two successive blocks may be performed substantially concurrently in practice or may be performed in a reverse order depending upon the related functions or operations.

Hereinafter, examples will be described in detail with reference to the accompanying drawings. When describing the examples with reference to the accompanying drawings, like reference numerals refer to like constituent elements and a repeated description related thereto will be omitted.

FIG. 1 illustrates an example of tracking a target in an input image by a target tracking apparatus.

A target tracking apparatus 100 may track a target in a video. The target tracking apparatus 100 may generate an input image within a single time frame and performing target tracking on the input image. The target tracking apparatus 100 may perform target tracking in real time using one or more neural networks. Hereinafter, the target will be referred to as an object.

The target tracking apparatus is a technique for detecting and tracking a position of a predetermined object in a video, and may be applied to all types of fields for tracking a predetermined object, such as a surveillance camera, a black box for a vehicle, and a smart phone including an image sensor. Here, the image sensor may include a smart sensor. In an example, the smart sensor is a sensor that implements the existing image sensor, memory, and processor in one semiconductor.

The target tracking apparatus may receive a template image as a first frame. The template image is a reference image that includes a target to be tracked. The target tracking apparatus may receive an input image on which target tracking is to be performed. For example, the template image may be a single frame of the input image. The target tracking apparatus may identify the target included in the first frame of the input image and track the target in subsequent successive frames.

The target tracking apparatus may obtain feature information of the template image and feature information of a region of interest (ROI) of the input image using a trained neural network. Here, the feature information may include a feature map or a feature matrix. The neural network may be a neural network to which a weight of a neural network trained for object classification is applied. The neural network may determine an objectness in the input image and represent activated feature values indicating the objectness in the form of a feature matrix. The neural network may be, for example, a Siamese network. The Siamese network is a neural network that calculates similar output vectors by processing two different input vectors simultaneously while using the same weight.

In an example, the target tracking apparatus may calculate a similarity between the feature information of the template image and the feature information of the ROI and obtain a region or a location having a highest similarity in the ROI. In an example, the target tracking apparatus may calculate a similarity between a feature matrix of the template image and a feature matrix of the ROI by calculating a cross-correlation between the feature matrix of the template image and the feature matrix of the ROI. The target tracking apparatus may specify the distribution of feature values having highest similarities to the template image in the ROI as a bounding box. The target tracking apparatus may estimate the estimated bounding box or position to be a region or position of the target.

The image sensor may acquire the input image. The image sensor may receive input light and store optical information. The optical information is analog information and may be converted into digital information. The digital information may be temporarily stored in a memory as the input image. This process may be referred to as a read-out process. Then, target tracking may be performed on the input image. As described above, in this process, the feature information of the template image and the feature information of the ROI may be extracted, the cross-correlation may be calculated, and the similarity may be determined.

In an example, the read-out process occupies a significant proportion within a single time frame. For example, if the time frame is 33 milliseconds (ms) long, the read-out process may occupy 25 ms. Hereinafter, a time for which the read-out process is performed within a single time frame will be referred to as a first time period. During the remaining time, for example, for a time shorter than 5 ms, target tracking may be performed. Hereinafter, a time during which target tracking, except for the read-out process, is performed within a single time frame will be referred to as a second time period. Within the single time frame, the first time period precedes the second time period The target tracking apparatus may perform target tracking on an input image acquired in the first time period within the single time frame, using a light-weight neural network in the second time period. The target tracking apparatus may perform target tracking on an input image generated within the same time frame. When compared to an example of performing, in a subsequent time frame, target tracking on an input image generated in a current time frame, the target tracking apparatus may estimate the position of the target more quickly. Since the position of the target continuously moves in a video, tracking the target in the same time frame exhibits a higher accuracy than tracking the target in a subsequent time frame. Through this, the target tracking apparatus may track the position of the target in real time. Hereinafter, the neural network used in the second time period will be referred to as the second neural network.

In another example, the target tracking apparatus may increase the accuracy of the position of the target using the first time period. The target tracking apparatus may assist the second neural network using the first neural network. The first neural network may obtain the bounding box indicating the position information of the target in an input image of a previous time frame. The first neural network may have a higher accuracy than the second neural network, and more computing resources are required for a high accuracy. Thus, the input image of the previous time frame may be processed during the first time period which is sufficient. In this regard, the second neural network may be referred to as a little neural network, and the first neural network may be referred to as a big neural network.

Referring to FIG. 1, the target tracking apparatus 100 may receive a first input image 101 of an input image. As shown, the input image 101 includes a target to be tracked. The target tracking apparatus may identify the target included in the input image 101, and tracks the target in subsequent successive input images 102, 103, 104, and 105.

The target tracking apparatus 100 may generate the input image 103 during a first time period within a single time frame. The target tracking apparatus 100 may estimate the position of the target included in the input image 102 and obtain a bounding box, using the first neural network during the first time period. The target tracking apparatus 100 may set a ROI based on the bounding box of the input image 102 using the second neural network during the second time period. The target tracking apparatus 100 may obtain a bounding box indicating the position of the target in a ROI of the input image 103 during the second time period. This process may be repeated on the remaining input images 104 and 105 as well. The bounding box may include position information and size information of the target.

TABLE 1

| Model | Frame delay | DP | OP |
| --- | --- | --- | --- |
| Little model | None | 73.5 | 67.7 |
| Big model | 1/None | 73.9/81.8 | 69.1/78.6 |
| Big little model | None | 80.3(+6.4%) | 77.5(+8.4%) |

Table 1 shows the result of comparing the two examples and the existing method. Here, the little model indicates a case where only the second neural network is used, and corresponds to one example. The big model indicates a case where only the first neural network is used, and is a reference example for comparison. The big little model indicates a case where the first neural network and the second neural network are used together, and corresponds to another example.

Distance precision (DP) refers to a ratio of the number of frames in which a difference between the center point of a correct-answer bounding box indicating the exact position of an object and the center point of a bounding box estimated by the model is less than 20 pixels. Overlap precision (OP) refers to a ratio of the number of frames in which an overlapping area between a correct-answer bounding box and an estimated bounding box is 50% or more.

According to Table 1, the little model has a DP of 73.5, the big model has a DP of 73.9 if the frame delay is 1 and has a DP of 81.8 in an ideal case where there is no frame delay, and the big little model has a DP of 80.3. A case where there is no frame delay is an ideal case for the big model and is simply for comparison. The DP of the big little model is 6.4% higher than that in the case for the big model where the frame delay is 1.

The little model shows a lower DP than the case for the big model where the frame delay is 1. However, in practice, a target moves during the frame delay of 1 of the big model, and the target is tracked in a 1-frame earlier image. Thus, the actual accuracy of the big model may be much lower than 73.9. Therefore, there is a practical advantage of using the little model capable of real-time processing.

The little model has an OP of 67.7, the big model has an OP of 69.1 if the frame delay is 1 and has an OP of 78.6 in the ideal case where there is no frame delay, and the big little model has an OP of 77.5. A case where there is no frame delay is an ideal case for the big model and is simply for comparison. The OP of the big little model is 8.4% higher than that in the case for the big model where the frame delay is 1.

The little model shows a lower OP than the case for the big model where the frame delay is 1. However, in practice, a target moves during the frame delay of 1 of the big model, and the target is tracked in a 1-frame earlier image. Thus, the actual accuracy of the big model may be much lower than 69.1. Therefore, there is a practical advantage of using the little model capable of real-time processing.

Figure 2:
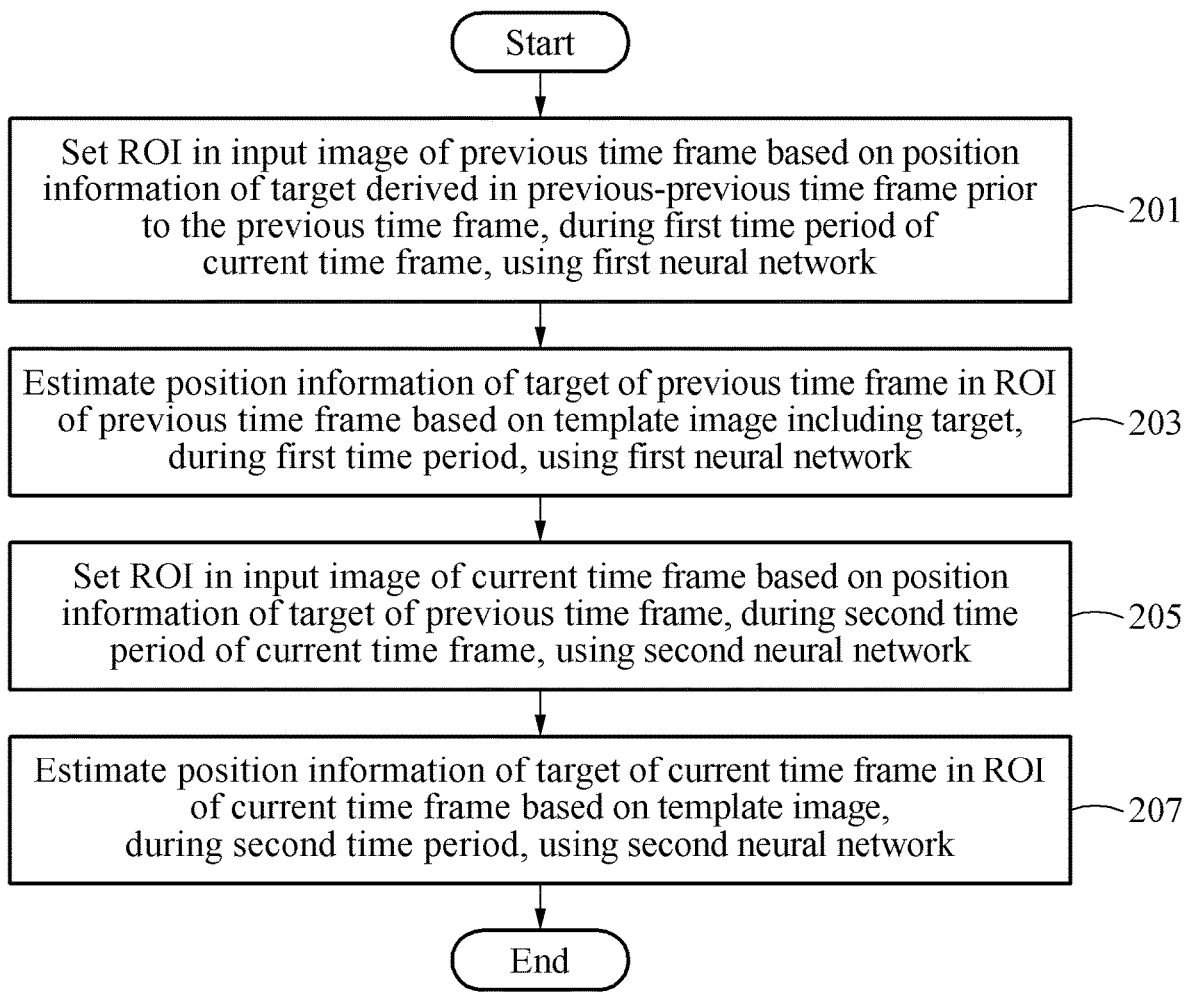
FIG. 2 illustrates an example of a target tracking method.

FIG. 2 illustrates an example of a target tracking method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Hereinafter, the time passes in an order of a previous-previous time frame, a previous time frame, and a current time frame.

In operation 201, the target tracking apparatus 100 sets a ROI in an input image of a previous time frame based on position information of a target derived in a previous-previous time frame, during a first time period of a current time frame, using a first neural network.

The target tracking apparatus 100 may preprocess an image to be input into the first neural network. The target tracking apparatus 100 may crop the ROI of the previous time frame from the input image of the previous time frame. The target tracking apparatus 100 may resize the cropped ROI of the previous time frame to a size. The target tracking apparatus 100 may input the resized ROI of the previous time frame into the first neural network.

In operation 203, the target tracking apparatus 100 estimates position information of the target of the previous time frame in the ROI of the previous time frame based on a template image including the target, during the first time period, using the first neural network. For example, the target tracking apparatus 100 may obtain a bounding box of the previous time frame indicating the position and the size of the target of the previous time frame.

The target tracking apparatus 100 may extract a feature matrix of the template image and a feature matrix of the ROI of the previous time frame, using the first neural network. The target tracking apparatus 100 may calculate a similarity between the feature matrix of the template image and the feature matrix of the ROI of the previous time frame, using the first neural network. The target tracking apparatus 100 may estimate the position information of the target of the previous time frame from a region having a highest similarity in the ROI of the previous time frame, using the first neural network. For example, the target tracking apparatus 100 may obtain a bounding box of the previous time frame indicating the position and the size of the target of the previous time frame.

In operation 205, the target tracking apparatus 100 sets a ROI in an input image of the current time frame based on the position information of the target of the previous time frame, during a second time period of the current time frame, using a second neural network.

The target tracking apparatus 100 may preprocess an image to be input into the second neural network. The target tracking apparatus 100 may crop the ROI of the current time frame from the input image of the current time frame. The target tracking apparatus 100 may resize the cropped ROI of the current time frame to a predetermined size. The target tracking apparatus 100 may input the resized ROI of the current time frame into the second neural network.

In operation 207, the target tracking apparatus 100 estimates position information of the target of the current time frame in the ROI of the current time frame based on the template image, during the second time period, using the second neural network. For example, the target tracking apparatus 100 may obtain a bounding box of the current time frame indicating the position and the size of the target of the current time frame.

The target tracking apparatus 100 may extract a feature matrix of the template image and a feature matrix of the ROI of the current time frame, using the second neural network. The target tracking apparatus 100 may calculate a similarity between the feature matrix of the template image and the feature matrix of the ROI of the current time frame, using the second neural network. The target tracking apparatus 100 may estimate the position information of the target of the current time frame from a region having a highest similarity in the ROI of the current time frame, using the second neural network. For example, the target tracking apparatus 100 may obtain a bounding box of the current time frame indicating the position and the size of the target of the current time frame.

The input image of the current time frame may be acquired by digitizing optical information stored in an image sensor, during the first time period. Read-out of the input image may be performed during the first time period.

The accuracy of the first neural network may be higher than the accuracy of the second neural network. The first neural network may include more layers than the second neural network or be trained with more training data.

The target tracking apparatus 100 may output the bounding box obtained using the second neural network. For example, the bounding box obtained using the second neural network may be output to a display with respect to the input image of the current time frame.

As described above, the bounding box obtained using the second neural network is only output to the display with respect to the current time frame or applied in an application, and may not be applied in a subsequent time frame. A bounding box to be used to track the position of the target in a subsequent time frame may be the bounding box obtained by the first neural network.

The target tracking apparatus 100 may temporarily utilize the position information estimated by the second neural network having a high speed but a low accuracy, and use the position information estimated by the first neural network having a low speed but a high accuracy to track the target afterward. Through this, the target tracking apparatus 100 may track the target with relatively high speed and accuracy.

Figure 3:
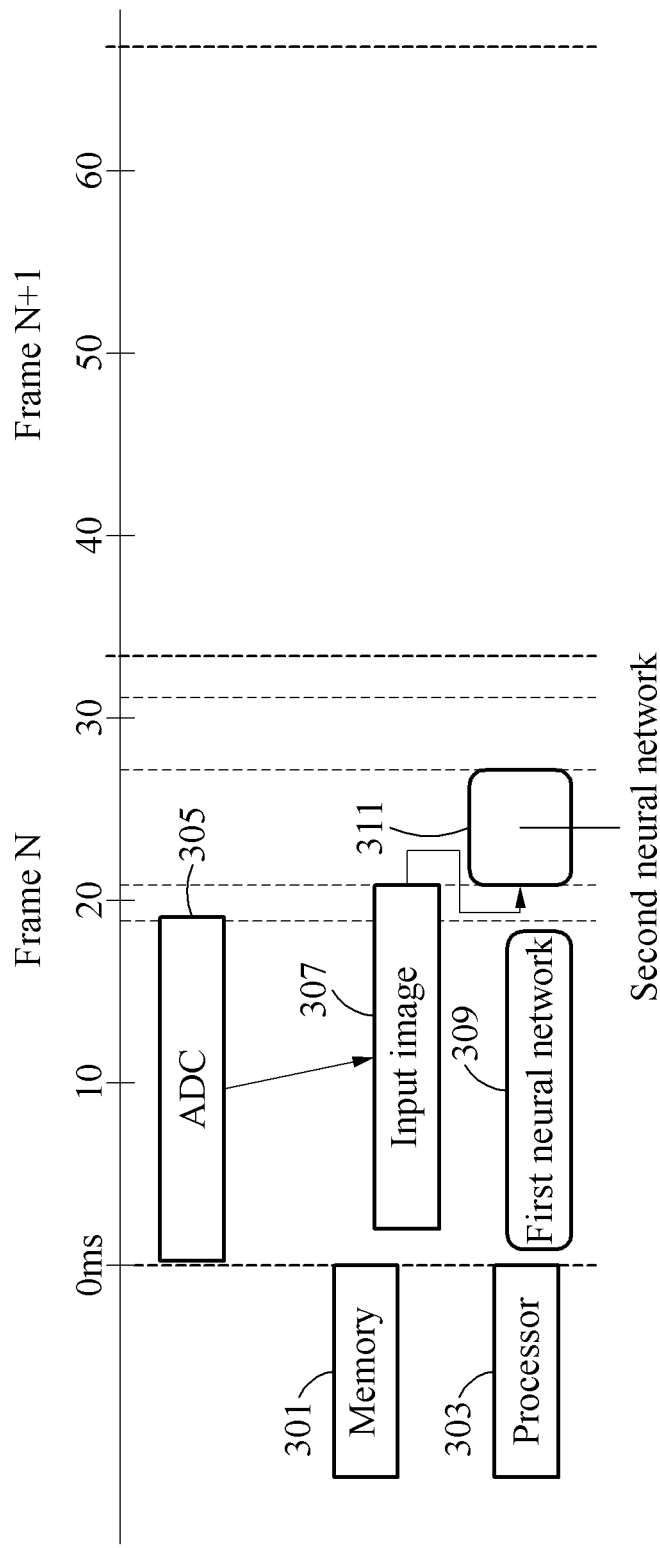
FIG. 3 illustrates an example of a target tracking method according to a performer and a time.

FIG. 3 illustrates an example of a target tracking method according to a performer and a time.

The target tracking apparatus 100 may include a processor 303 and a memory 301. In an example, the target tracking apparatus 100 may include the processor 303 and the memory 301 as separate semiconductors. In another example, the target tracking apparatus 100 may be a single semiconductor manufactured by integrating a portion that functions as a processor and a portion that functions as a memory. An imaging semiconductor in the form as described above may be referred to as a smart sensor.

Referring to FIG. 3, read-out of an input image and target tracking may be performed together in a frame N, which is a single time frame. For example, the frame N may be 33 ms long. The read-out may be performed within a first time period. For example, the first time period may be about 20 ms. In the read-out, optical information, which is analog data stored in an image sensor, may be converted into an input image 307 being digital data through an analog-to-digital converter (ADC) 305. The input image 307 may be temporarily stored in the memory 301.

Target tracking on an input image of a previous time frame may be performed in the first time period. Target tracking on the input image of the previous time frame may be performed in the first time period by a first neural network 309. Since the first time period is longer than a second time period, a bounding box may be obtained by the relatively heavy first neural network 309.

Target tracking on the input image may be performed within the second time period. The second time period may be about 5 ms. Since the second time period is shorter than the first time period, target tracking may be performed on the input image of the frame N, which is the current time frame, by a relatively light second neural network 311. Target tracking on the input image of the frame N may be performed by the second neural network 311 during the second time period, based on position information of a bounding box obtained by the first neural network 309.

As described above, the input image generated in the frame N is processed within the frame N and is not processed in a frame N+1 or a subsequent frame, whereby target tracking may be performed in real time. Further, the target tracking apparatus 100 may perform target tracking on a previous input image during the first time period during which the read-out is performed, and perform target tracking on the input image of the frame N based on the same, thereby increasing the accuracy.

Figure 4:
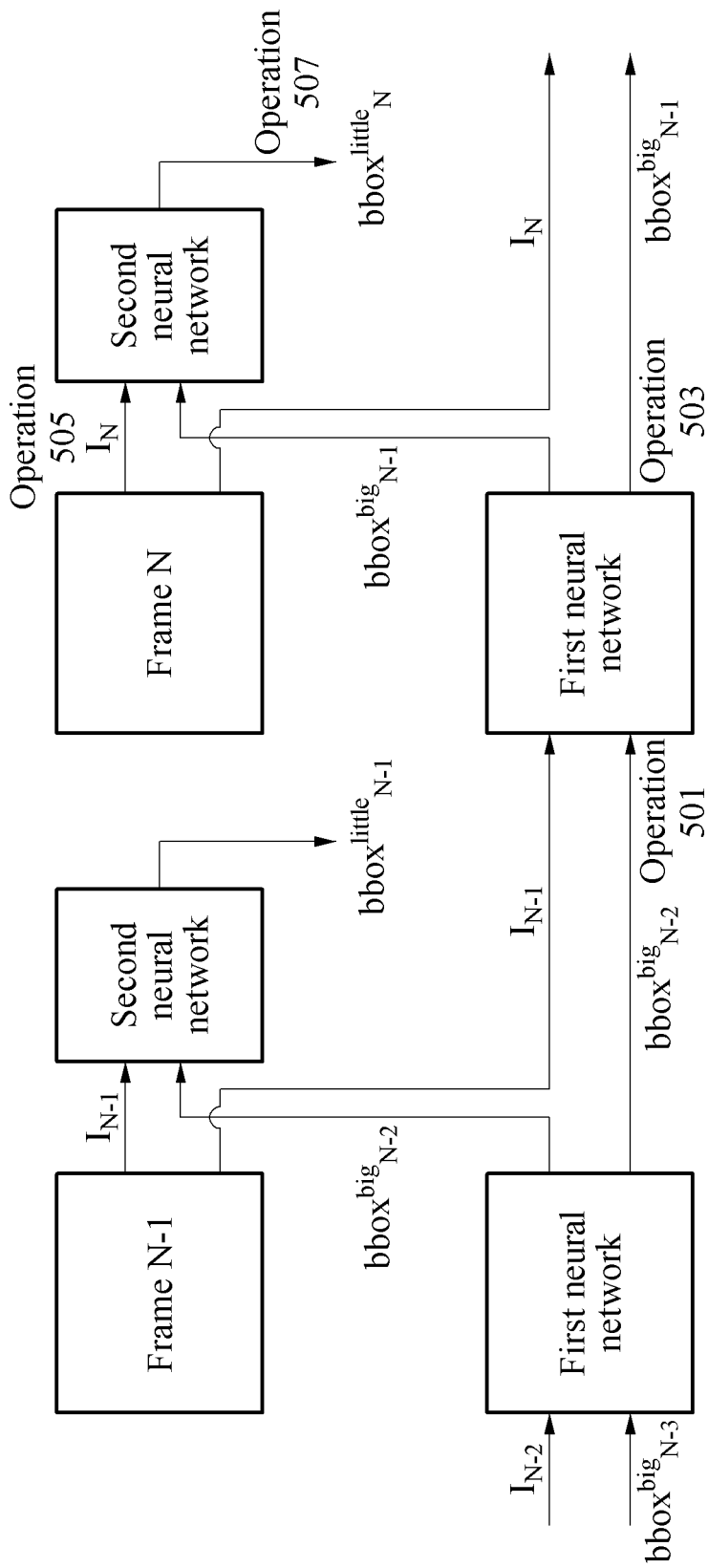
FIG. 4 illustrates an example of a target tracking method according to a type of a neural network.
Figure 5:
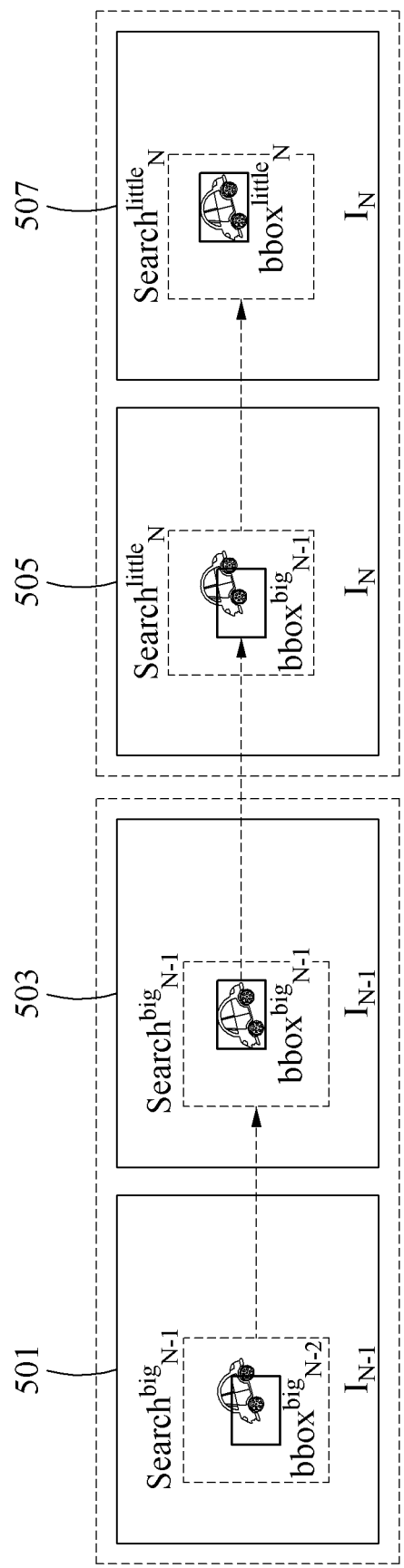
FIG. 5 illustrates an example of a target tracking method in conjunction with FIG. 4.

FIG. 4 illustrates an example of a target tracking method according to a type of a neural network. FIG. 5 illustrates an example of a target tracking method in conjunction with FIG. 4. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 4, read-out of an input image of a frame N−1 may be performed in a box indicated as Frame N−1, and read-out of an input image of a frame N may be performed in a box indicated as Frame N. In FIG. 4, the superscript "big" denotes data processed by the first neural network, and the superscript "little" denotes data processed by the second neural network. $I_N$ denotes an input image generated in a frame N, which is a time frame, and $I_{N-1}$ denotes an input image generated in a frame N−1, which is another time frame. $bbox_N$ denotes a bounding box acquired in frame N, $bbox_{N-1}$ denotes a bounding box acquired in frame N−1, and $bbox_{N-2}$ denotes a bounding box acquired in frame N−2.

Referring to FIG. 4, the target tracking apparatus 100 may crop and resize a ROI including $bbox^{big}_{N-3}$ by preprocessing $I_{N-2}$ and $bbox^{big}_{N-3}$. The target tracking apparatus 100 may estimate $bbox^{big}_{N-2}$ by inputting the ROI into the first neural network. The target tracking apparatus 100 may crop and resize a ROI including $bbox^{big}_{N-2}$ by preprocessing $I_{N-1}$ and $bbox^{big}_{N-2}$. The target tracking apparatus 100 may estimate $bbox^{little}_{N-1}$ by inputting the ROI into the second neural network.

Referring to FIGS. 4 and 5, in operation 501, the target tracking apparatus 100 may crop and resize a ROI including $bbox^{big}_{N-2}$ by preprocessing $I_{N-1}$ and $bbox^{big}_{N-2}$. The target tracking apparatus 100 may set the ROI based on bbox$^{big}_{N-2}$, which is a bounding box of the frame N−2.

In operation 503, the target tracking apparatus 100 may estimate bbox$^{big}_{N-1}$ by inputting the ROI into the first neural network. The target tracking apparatus 100 may obtain, in the set ROI, bbox$^{big}_{N-1}$, which is a bounding box of the frame N−1.

In operation 505, the target tracking apparatus 100 may crop and resize a ROI including bbox$^{big}_{N-1}$ by preprocessing $I_N$ and bbox$^{big}_{N-1}$. The target tracking apparatus 100 may set the ROI based on bbox$^{big}_{N-1}$, which is a bounding box of the frame N−1.

In operation 507, the target tracking apparatus 100 may estimate bbox$^{little}_{N}$ by inputting the ROI into the second neural network. The target tracking apparatus 100 may obtain, in the set ROI, bbox$^{big}_{N-1}$, which is a bounding box of the frame N.

Figure 6:
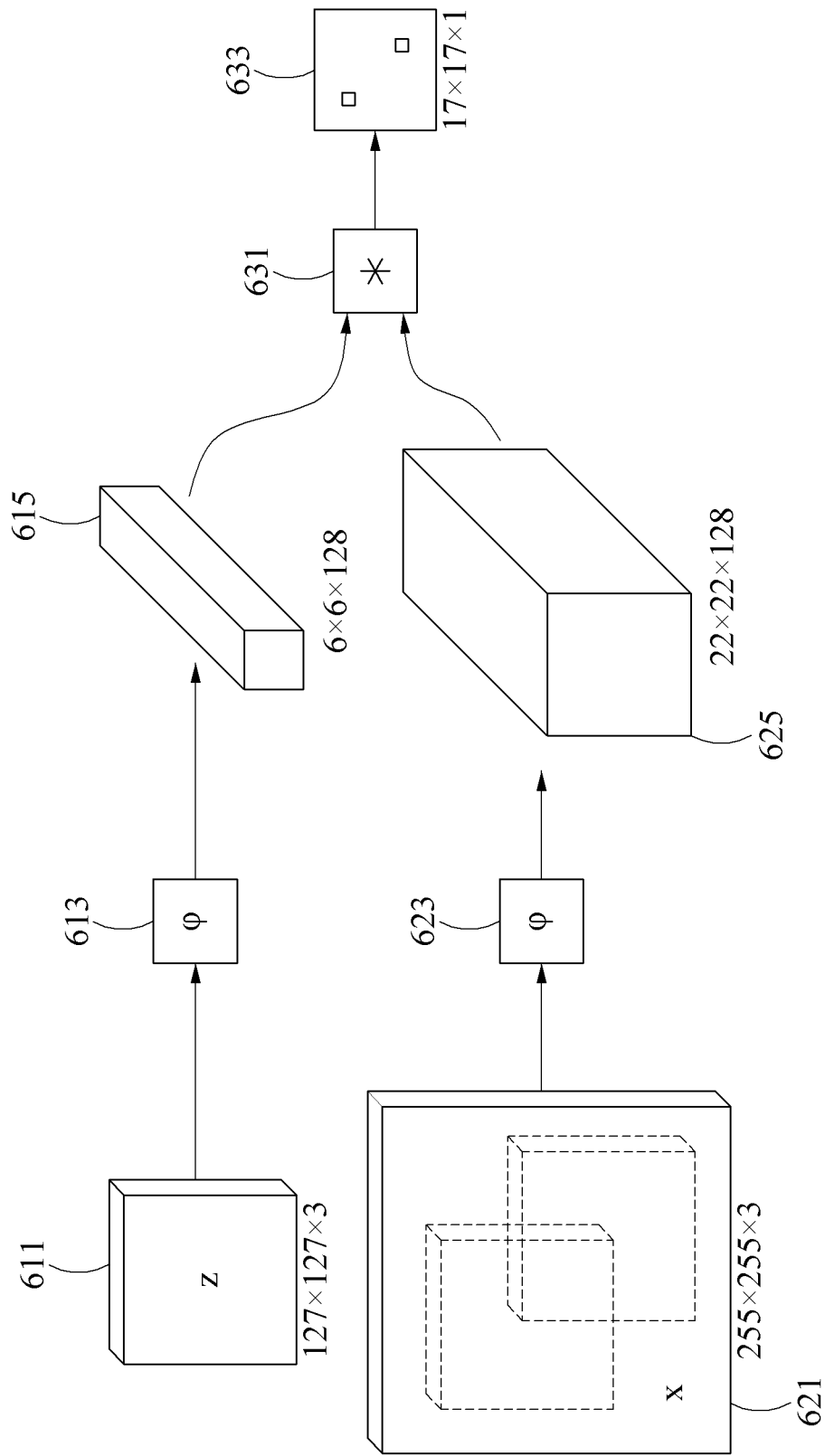
FIG. 6 illustrates an example of acquiring a bounding box.

FIG. 6 illustrates an example of acquiring a bounding box.

Referring to FIG. 6, the target tracking apparatus 100 may receive a template image z 611. For example, the template image z 611 may have 127=127×3 dimensions. The target tracking apparatus 100 may obtain a feature matrix 615 by inputting the template image z 611 into a neural network 613. For example, the feature matrix 615 may have 6×6×128 dimensions.

The target tracking apparatus 100 may receive a ROI on which target tracking is to be performed. For example, a ROI x 621 may have 255×255×3 dimensions. The target tracking apparatus 100 may obtain a feature matrix 625 by inputting the ROI x 621 into a neural network 623. For example, the feature matrix 625 may have 22×22×128 dimensions. The neural network 613 and the neural network 623 may be the same or different from each other. The feature matrices 615 and 625 may include activated feature values indicating the objectness determined in the input image.

The target tracking apparatus 100 may calculate a similarity between the feature matrices 615 and 625, and obtain the position or a region having a highest similarity to the template image z 611, in the ROI x 621. The target tracking apparatus 100 may calculate the similarity between the feature matrix of the template image z 611 and the feature matrix of the ROI x 621 through a calculation 631 of a cross-correlation between the feature matrix of the template image z 611 and the feature matrix of the ROI x 621. A score matrix 633 including the distribution of the feature values indicating such similarities may be output.

The target tracking apparatus 100 may specify, as a bounding box, the distribution of feature values having highest similarities to the template image z 611, within the ROI. The target tracking apparatus may estimate the estimated bounding box or position to be a region or position of the target.

Figure 7:
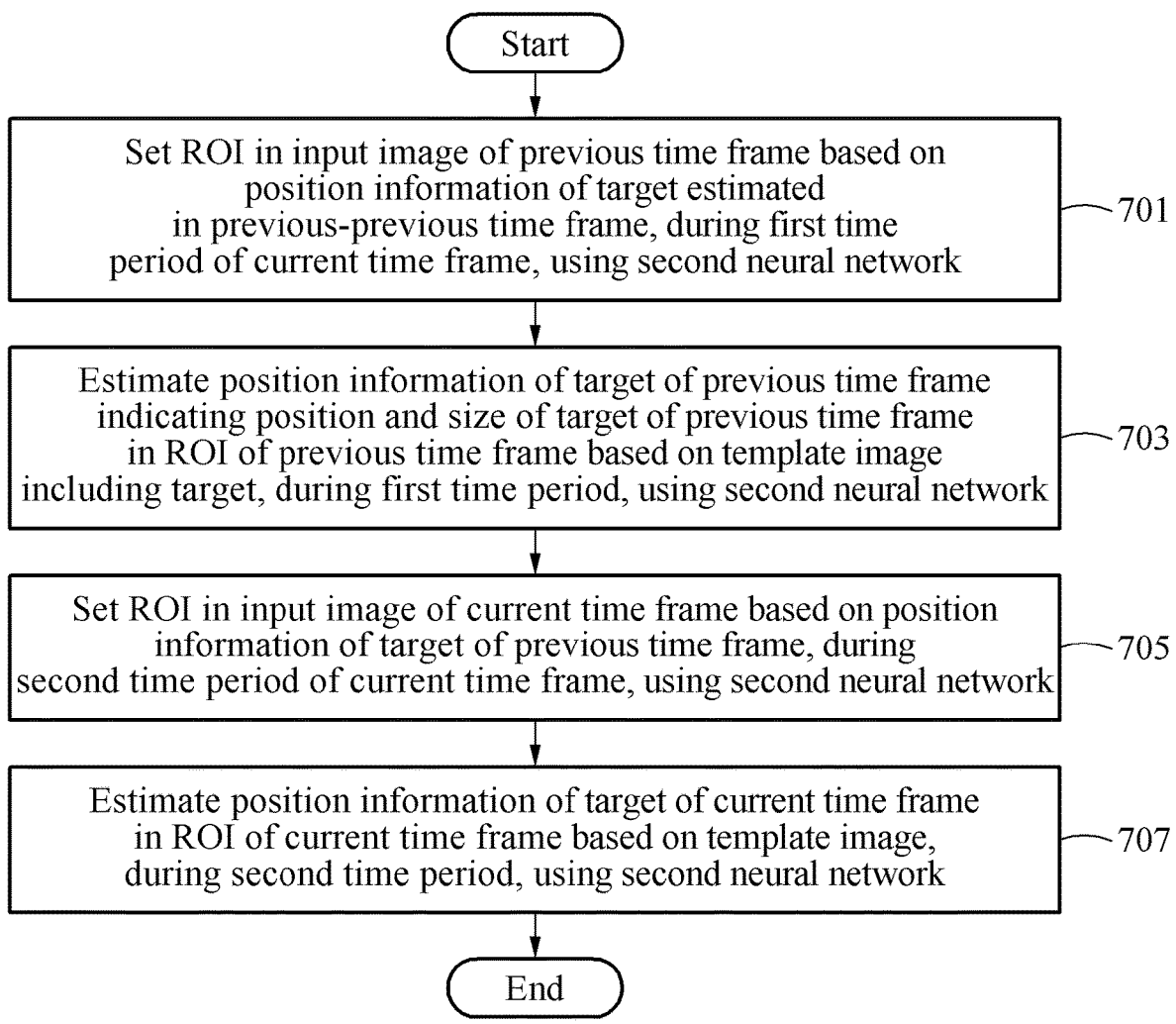
FIG. 7 illustrates another example of a target tracking method.

FIG. 7 illustrates another example of a target tracking method. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer, such as a processor, that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

In operation 701, the target tracking apparatus 100 sets a ROI in an input image of a previous time frame based on position information of a target estimated in a previous-previous time frame, during a first time period of a current time frame, using a second neural network.

In operation 703, the target tracking apparatus 100 estimates position information of the target of the previous time frame in the ROI of the previous time frame based on a template image including the target, during the first time period, using the second neural network. For example, the target tracking apparatus 100 obtains a bounding box of the previous time frame indicating the position and the size of the target of the previous time frame.

In operation 705, the target tracking apparatus 100 sets a ROI in an input image of the current time frame based on the position information of the target of the previous time frame, during a second time period of the current time frame, using the second neural network.

In operation 707, the target tracking apparatus 100 estimates position information of the target of the current time frame in the ROI of the current time frame based on the template image, during the second time period, using the second neural network. For example, the target tracking apparatus 100 obtains a bounding box of the current time frame indicating the position and the size of the target of the current time frame.

The input image of the current time frame may be acquired by digitizing optical information stored in an image sensor, during the first time period. Read-out of the input image may be performed during the first time period.

As described above, the bounding box or position information of the target obtained using the second neural network is only output to the display with respect to the current time frame or applied in an application, and at the same time applied in a subsequent time frame. The target tracking apparatus 100 may track, in real time, a target with respect to input images generated within the same time frame, thereby reducing errors that may occur if the target moves in a video.

Figure 8:
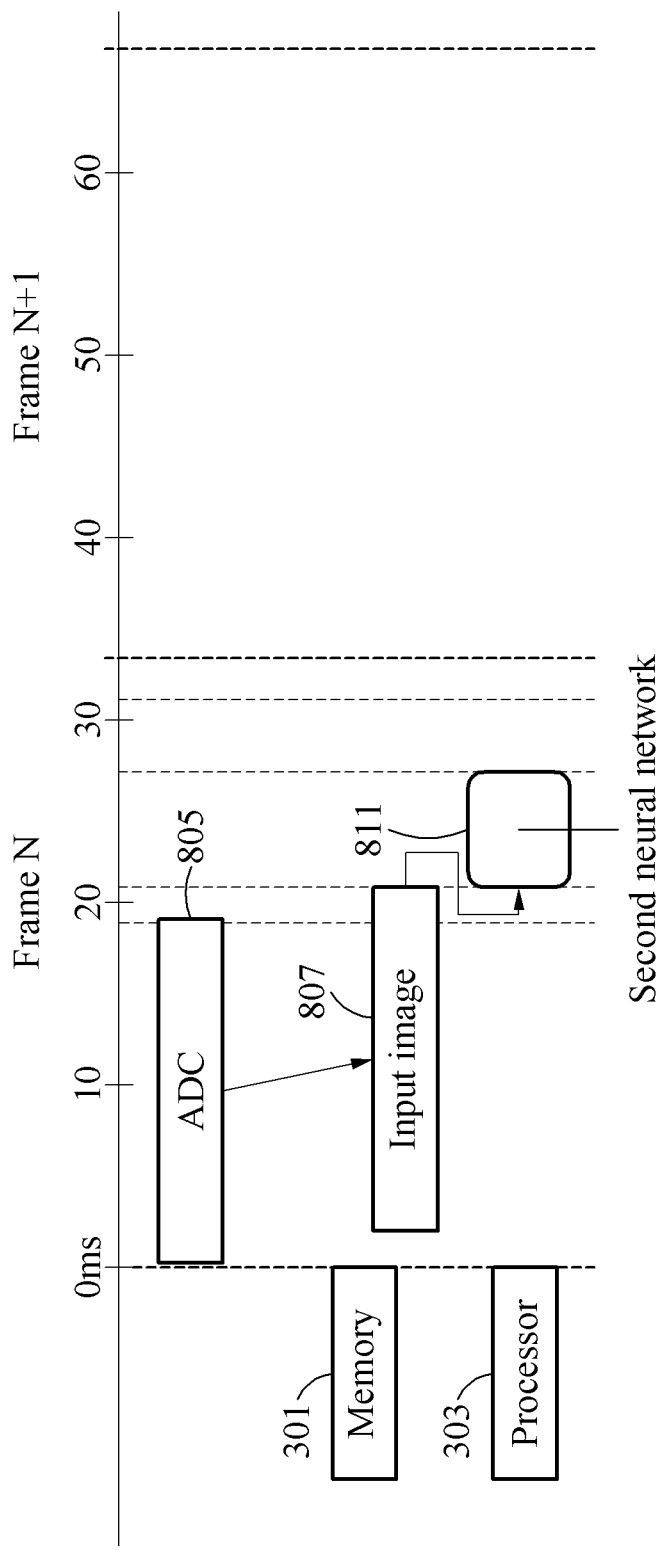
FIG. 8 illustrates another example of a target tracking method according to a performer and a time.

FIG. 8 illustrates another example of a target tracking method according to a subject and a time.

In an example, the target tracking apparatus 100 may include the processor 303 and the memory 301. In an example, the target tracking apparatus 100 may include the processor 303 and the memory 301 as separate semiconductors. In another example, the target tracking apparatus 100 may be a single semiconductor manufactured by integrating a portion that functions as a processor and a portion that functions as a memory. An imaging semiconductor in the form as described above may be referred to as a smart sensor.

Referring to FIG. 8, read-out of an input image and target tracking may be performed together in a frame N, which is a single time frame. For example, the frame N may be 33 ms long. The read-out may be performed within a first time period. For example, the first time period may be about 20 ms. In the read-out, optical information, which is analog data stored in an image sensor, may be converted into an input image 807 being digital data through an ADC 805. The input image 807 may be temporarily stored in the memory 301.

Target tracking on the input image may be performed within the second time period. The second time period may be about 5 ms. Since the second time period is shorter than the first time period, target tracking may be performed on the input image of the frame N, which is the current time frame, by a relatively light second neural network 811. Target tracking on the input image of the frame N may be performed by the second neural network 811 during the second time period, based on position information of a bounding box in a previous time frame obtained by the second neural network 811.

As described above, the input image generated in the frame N is processed within the frame N and is not processed in a frame N+1 or a subsequent frame, whereby target tracking may be performed in real time, and errors occurring when tracking is performed with a time difference may be alleviated.

Figure 9:
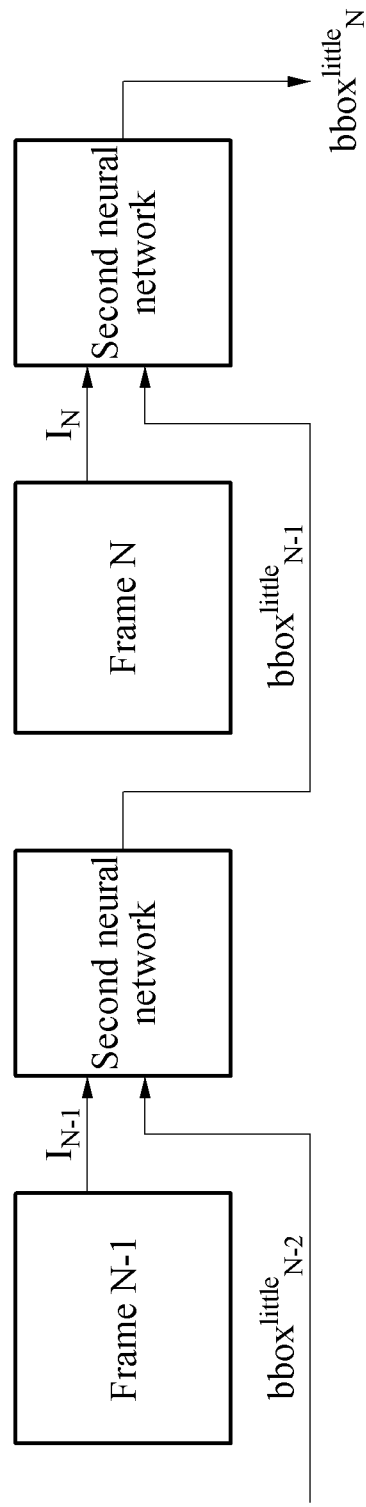
FIG. 9 illustrates another example of a target tracking method according to a type of a neural network.

FIG. 9 illustrates another example of a target tracking method according to a type of a neural network.

Referring to FIG. 9, read-out of an input image of a frame N−1 may be performed in a box indicated as Frame N−1, and read-out of an input image of a frame N may be performed in a box indicated as Frame N. In FIG. 9, the superscript "little" denotes data processed by the second neural network. $I_N$ denotes an input image generated in a frame N, which is a time frame, and $I_{N-1}$ denotes an input image generated in a frame N−1, which is a time frame. $bbox_N$ denotes a bounding box obtained in the frame N, $bbox_{N-1}$ denotes a bounding box obtained in the frame N−1, and $bbox_{N-2}$ denotes a bounding box obtained in a frame N−2 which is a time frame.

Referring to FIG. 9, the target tracking apparatus 100 may crop and resize a ROI including $bbox^{little}_{N-2}$ by preprocessing $I_{N-1}$ and $bbox^{little}_{N-2}$. The target tracking apparatus 100 may estimate $bbox^{little}_{N-1}$ by inputting the ROI into the second neural network. The target tracking apparatus 100 may crop and resize a ROI including $bbox^{little}_{N-1}$ by preprocessing $I_N$ and $bbox^{little}_{N-1}$. The target tracking apparatus 100 may set the ROI based on $bbox^{little}_{N-1}$, which is a bounding box of the frame N−1. The target tracking apparatus 100 may estimate $bbox^{little}_N$ by inputting the ROI into the second neural network. The target tracking apparatus 100 may obtain, in the set ROI, $bbox^{little}_N$, which is a bounding box of the frame N.

Figure 10:
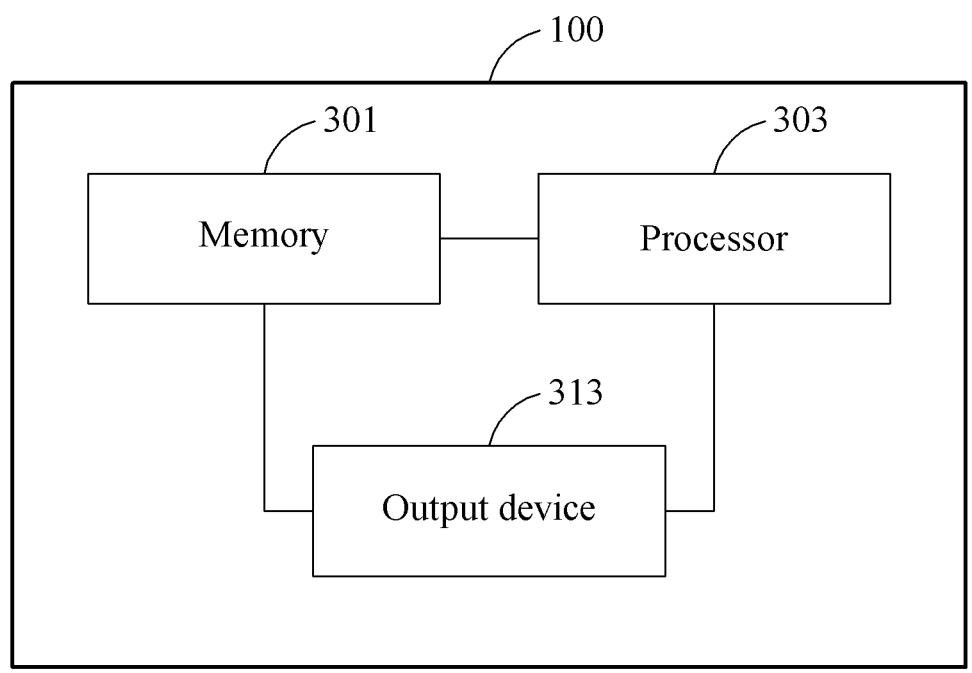
FIG. 10 illustrates an example of a configuration of a target tracking apparatus.

FIG. 10 illustrates an example of a configuration of a target tracking apparatus.

The target tracking apparatus 100 may include a processor 303, a memory 301, and an output device 313. In an example, the target tracking apparatus 100 may include the processor 303 and the memory 301 as separate semiconductors. In another example, the target tracking apparatus 100 may be a single semiconductor manufactured by integrating a portion that functions as a processor and a portion that functions as a memory. Although not shown, an imaging semiconductor in the form as described above, which is referred to as a smart sensor may also be included.

In an example, the processor 303 sets a ROI in an input image of a previous time frame based on a bounding box or position information of a target estimated in a previous-previous time frame, during a first time period of a current time frame, using a first neural network. The processor 303 estimates the position information of the target of the previous time frame in the ROI of the previous time frame based on a template image including the target, during the first time period, using the first neural network. For example, the processor 303 obtains a bounding box of the previous time frame indicating the position and the size of the target of the previous time frame. The processor 303 sets a ROI in an input image of the current time frame based on the bounding box or the position information of the target of the previous time frame, during a second time period of the current time frame, using a second neural network. The processor 303 estimates position information of the target of the current time frame in the ROI of the current time frame based on the template image, during the second time period, using the second neural network. For example, the processor 303 obtains a bounding box of the current time frame indicating the position and the size of the target of the current time frame. The input image of the current time frame may be acquired by digitizing optical information stored in the image sensor, during the first time period.

In another example, the processor 303 sets a ROI in an input image of a previous time frame based on a bounding box or position information of a target estimated in a previous-previous time frame, during a first time period of a current time frame, using a second neural network. The processor 303 estimates the position information of the target of the previous time frame in the ROI of the previous time frame based on a template image including the target, during the first time period, using the second neural network. For example, the processor 303 obtains a bounding box of the previous time frame indicating the position and the size of the target of the previous time frame. The processor 303 sets a ROI in an input image of the current time frame based on the bounding box or the position information of the target of the previous time frame, during a second time period of the current time frame, using a second neural network. The processor 303 estimates position information of the target of the current time frame in the ROI of the current time frame based on the template image, during the second time period, using the second neural network. For example, the processor 303 obtains a bounding box of the current time frame indicating the position and the size of the target of the current time frame. The input image of the current time frame may be acquired by digitizing optical information stored in an image sensor, during the first time period.

The bounding box obtained using the second neural network may be output to an output device 313 with respect to the input image of the current time frame or applied in an application through the output device 313. In an example, the bounding box obtained using the second neural network is only output to the output device 313 with respect to the current time frame or applied in an application, and may not be applied in a subsequent time frame. In another example, the bounding box or position information of the target obtained using the second neural network is output to the output device 313 with respect to the current time frame or applied in an application, and at the same time applied in a subsequent time frame.

In an example, the output device 313 is a physical structure that includes one or more hardware components that provide the ability to render a user interface, render a display, and/or receive user input. The output device 313 is not limited to the example described above, and any other displays, such as, for example, computer monitor and eye glass display (EGD) that are operatively connected to the target tracking apparatus 100 may be used without departing from the spirit and scope of the illustrative examples described. In an example, the output device 313 is a physical structure that includes one or more hardware components that provide the ability to render a user interface, render a display, output information, and/or receive user input.

The target tracking apparatus 100, and other apparatuses, units, modules, devices, and other components described herein with respect to FIGS. 1-10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), or any other device capable of responding to and executing instructions in a defined manner.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of tracking a target. In another example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of tracking a target, the method comprising:
setting, using a first neural network, a region of interest (ROI) in an input image of a second time frame based on position information of the target derived in a first time frame, during a first time period of a current time frame;
estimating, using the first neural network, position information of the target of the second time frame in the ROI of the second time frame based on a template image including the target, during the first time period;
setting, using a second neural network, a ROI in an input image of the current time frame based on the position information of the target of the second time frame, during a second time period of the current time frame; and
estimating, using the second neural network, position information of the target of the current time frame in the ROI of the current time frame based on the template image, during the second time period,
wherein the second time frame is subsequent to the first time frame, and the current time frame is subsequent to the second time frame.

2. The method of claim 1, wherein the input image of the current time frame is acquired by digitizing optical information stored in an image sensor, during the first time period.

3. The method of claim 1, wherein the accuracy of the first neural network is higher than the accuracy of the second neural network.

4. The method of claim 3, further comprising:
outputting a bounding box indicating the position information of the target of the current time frame estimated using the second neural network.

5. The method of claim 1, wherein the estimating of the position information of the target of the second time frame comprises:
extracting, using the first neural network, a feature matrix of the template image and a feature matrix of the ROI of the second time frame;
calculating, using the first neural network, a similarity between the feature matrix of the template image and the feature matrix of the ROI of the second time frame; and
estimating, using the first neural network, the position information of the target of the second time frame from a region having a highest similarity in the ROI of the second time frame, using the first neural network.

6. The method of claim 1, wherein the estimating of the position information of the target of the current time frame comprises:
extracting, using the second neural network a feature matrix of the template image and a feature matrix of the ROI of the current time frame;
calculating, using the second neural network, a similarity between the feature matrix of the template image and the feature matrix of the ROI of the current time frame; and
estimating, using the second neural network, the position information of the target of the current time frame from a region having a highest similarity in the ROI of the current time frame.

7. The method of claim 1, wherein the estimating of the position information of the target of the second time frame further comprises:
cropping the ROI of the second time frame from the input image of the second time frame;
resizing the cropped ROI of the second time frame to a predetermined size; and
inputting the resized ROI of the second time frame into the first neural network.

8. The method of claim 1, wherein the estimating of the position information of the target of the current time frame further comprises:
cropping the ROI of the current time frame from the input image of the current time frame;
resizing the cropped ROI of the current time frame to a predetermined size; and
inputting the resized ROI of the current time frame into the second neural network.

9. A non-transitory computer-readable storage medium storing instructions that, when executed by a processor, cause the processor to perform the method of claim 1.

10. A method of tracking a target, the method comprising:
setting, using a neural network, a region of interest (ROI) in an input image of a second time frame based on position information of a target estimated in a first time frame, during a first time period of a current time frame;
estimating, using the neural network, position information of the target of the second time frame in the ROI of the second time frame based on a template image including the target, during the first time period;
setting, using the neural network, a ROI in an input image of the current time frame based on the position information of the target of the second time frame, during a second time period of the current time frame; and
estimating, using the neural network, position information of the target of the current time frame in the ROI of the current time frame based on the template image, during the second time period,
wherein the second time frame is subsequent to the first time frame, and the current time frame is subsequent to the second time frame.

11. The method of claim 10, wherein, during the first time period, the input image of the current time frame is acquired by digitizing optical information stored in an image sensor.

12. An apparatus for tracking a target, the apparatus comprising:
a memory; and
a processor configured to:
set, using a first neural network, a region of interest (ROI) in an input image of a second time frame based on position information of a target estimated in the first time frame, during a first time period of a current time frame;
estimate, using the first neural network, position information of the target of the second time frame in the ROI of the second time frame based on a template image including the target, during the first time period;
set, using a second neural network, a ROI in an input image of the current time frame based on the position information of the target of the second time frame, during a second time period of the current time frame, and estimate, using the second neural network, position information of the target of the current time frame in the ROI of the current time frame based on the template image, during the second time period, wherein the second time frame is subsequent to the first time frame, and the current time frame is subsequent to the second time frame.

13. The apparatus of claim 12, wherein, during the first time period, the input image of the current time frame is acquired by digitizing optical information stored in an image sensor.

14. An apparatus for tracking a target, the apparatus comprising:

a memory; and a processor configured to:

set, using a neural network, a region of interest (ROI) in an input image of a second time frame based on the position information of a target estimated in the first time frame, during a first time period of a current time frame;

estimate, using the neural network, position information of the target of the second time frame in the ROI of the second time frame based on a template image including the target, during the first time period;

set, using the neural network, a ROI in an input image of the current time frame based on the position information of the target of the second time frame, during a second time period of the current time frame; and estimate, using the neural network, position information of the target of the current time frame in the ROI of the current time frame based on the template image, during the second time period, wherein the second time frame is subsequent to the first time frame, and the current time frame is subsequent to the second time frame.

15. The apparatus of claim 14, wherein, during the first time period, the input image of the current time frame is acquired by digitizing optical information stored in an image sensor.

* * * * *